(No Model.)
J. PICKERSGILL.
WAGON BRAKE.
No. 341,685. Patented May 11, 1886.
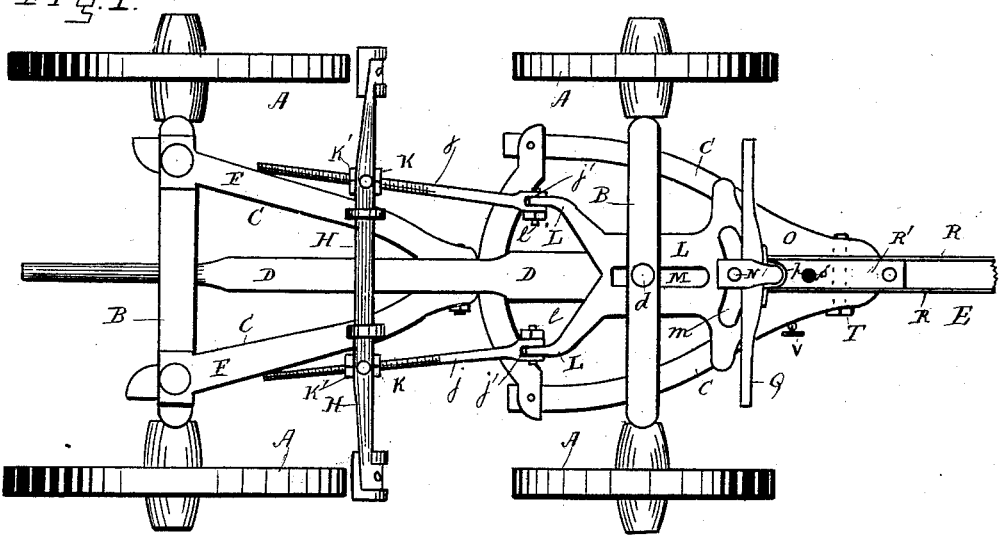
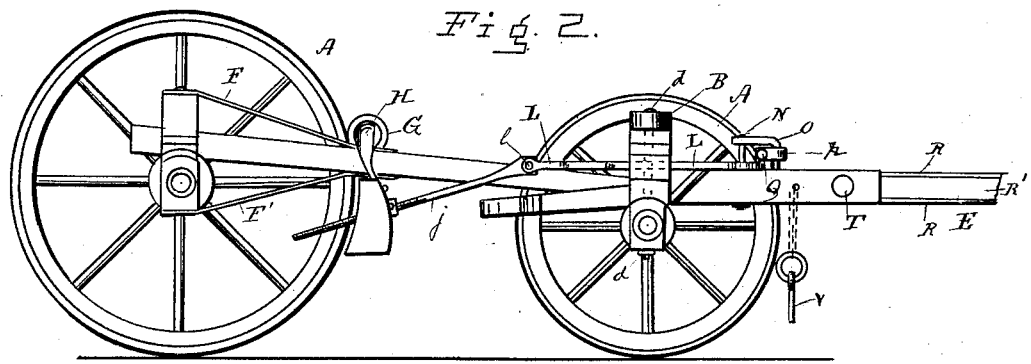
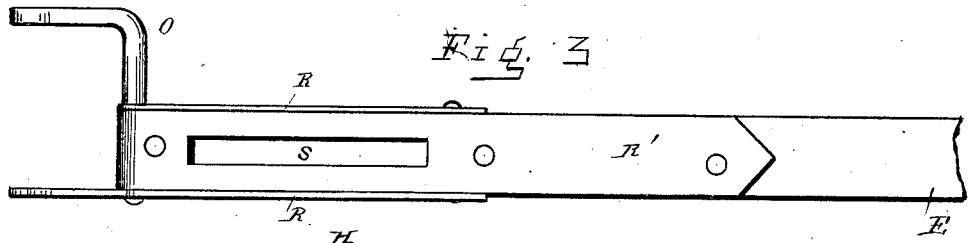
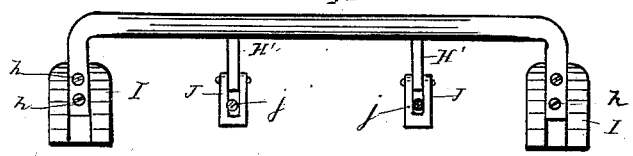
WITNESSES
Morton Toulmin
M. D. Murphy.
INVENTOR
John Pickersgill
Jr. H. Hunter
Attorney

UNITED STATES PATENT OFFICE.

JOHN PICKERSGILL, OF CENTRAL CITY, KENTUCKY.

WAGON-BRAKE.

SPECIFICATION forming part of Letters Patent No. 341,685, dated May 11, 1886.

Application filed March 26, 1886. Serial No. 196,724. (No model.)

*To all whom it may concern:*

Be it known that I, JOHN PICKERSGILL, a citizen of the United States, residing at Central City, in the county of Muhlenburg and State of Kentucky, have invented certain new and useful Improvements in Wagon-Brakes, of which the following is a specification, reference being had therein to the accompanying drawings.

This invention relates to improvements in wagon-brakes, and has for its object to furnish a simple and effective brake which is automatic in its action, both in putting the brake on and in taking it off, thereby avoiding accidents by reason of any forgetfulness of the driver. This object is attained by the mechanism illustrated in the accompanying drawings, forming a part of this specification.

Figure 1 is a plan of a wagon provided with a brake of this kind. Fig. 2 is a side elevation. Fig. 3 is a detached view of the pole of the wagon. Fig. 4 is a detached view of the transverse bar H.

The letter A indicates the wheels of the wagon; B, the bolsters; C, the hounds; D, the coupling-pole; d, the king-bolt; E, the pole.

F F' are metal braces, through the front ends of which are eyebolts G, extending through the hounds B, which support a transverse iron bar, H, which oscillates therein. The ends of this bar are flattened, turned in a downward direction, and provided with openings for the passage of the screws h, whereby the brake-shoes (of wood) I are secured thereto.

Attached to the transverse bar H, on each side of the hounds D, in a downward direction, are arms H', to the lower ends of which are pivoted U-shaped pieces of metal, J, through which extend the screw-threaded rods j, each of which is provided with nuts K K', which bear against the opposite sides of the U-shaped piece J, and are intended to provide means of adjustment to the rods j, whereby they may be lengthened or shortened, as desired. The forward ends of the rods j are somewhat enlarged and provided with slots j', to receive the rear ends of a bifurcated metal plate, L, to which they are secured by the bolts l, suitable openings in the rods j and in the plate L being provided for the passage of these bolts. A slot, M, in the plate L permits the passage of the king-bolt d, and allows the said plate L to have a free backward and forward motion, and a curved slot, m, in the front end of the plate L, for the passage of the bolt N, permits the front axle to be turned in either direction when in the act of turning the wagon, and also forms a bearing against which the bolt N presses in one direction when the wheels are locked, and in the opposite direction when they are released.

The bolt N extends in a vertical direction through suitable openings in a metal yoke, O, attached to the rear end of the wagon-pole E. This yoke O extends in an upward direction a short distance above the upper side of the pole E, and also serves the purpose to receive a strap, p, whereby a double-tree, Q, is secured to the pole. Metal plates R R' are attached to the pole E, in order to strengthen it, and the pole E has also a slot, S, to receive the bolt T. This slot S permits the pole to slide back and forth upon the bolt T, for a purpose hereinafter described. An opening, s, in the pole E receives a pin, V, when it is desired to maintain the pole in a stationary position and prevent its sliding back and forth over the bolt T.

From the foregoing it will be seen that upon level ground or uphill, when the team is pulling the wagon, the slot S will permit the pole to be pulled in a forward direction, and that the bolt N will then draw the plate L with it, together with the rods j, and thereby turn the transverse bar H upon its axis, and thereby remove the brakes I from pressing against the wheels A. On the other hand, when descending a hill, the team, in holding back, causes the pole to slide in the opposite direction, and thus cause the brake-shoes I to bear against the wheels A and lock them.

Having described my invention, what I desire to secure by Letters Patent, and claim, is—

1. In an automatic wagon-brake, the pole E, having a slot, S, and yoke O, in combination with bolt T, bolt N, and slotted plate L, as described, and for the purposes set forth.

2. In an automatic wagon-brake, the pole E, having slot S, yoke O, and plates R R', in combination with double-tree Q and strap p, as described, and for the purposes set forth.

3. In an automatic wagon-brake, the pole E, having plates R R', slot S, and opening s, in combination with pin V, as described, and for the purposes set forth.

4. In an automatic wagon-brake, the transverse bar H, having secured at each end thereof the brake-shoes I and the arms H', in combination with the U-shaped pieces J, adjustable rods j, and slotted plate L, all operated as herein described, and for the purposes set forth.

5. In an automatic wagon-brake, the oscillating transverse bar H, having downwardly-projecting arms H', the U-shaped pieces J, pivoted to said arms, the screw-threaded rods j, provided with nuts K K', and the slotted plate L, pivoted to the rods j, in combination with bolt N, yoke O, pole E, having slot S, and bolt T, the whole operating in the manner herein described, and for the purposes set forth.

In testimony whereof I affix my signature in presence of two witnesses.

JOHN X PICKERSGILL.
his mark.

Witnesses:
GEORGE GORDON,
LEWIS T. COLEMAN.